US011760482B1

(12) United States Patent
Durand

(10) Patent No.: US 11,760,482 B1
(45) Date of Patent: *Sep. 19, 2023

(54) UPDATING VIRTUAL AERIAL MAP USING SENSORS ASSOCIATED WITH AERIAL VEHICLES

(71) Applicant: Amazon Technologies, Inc., Seattle, WA (US)

(72) Inventor: Jean-Guillaume Dominique Durand, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/384,222

(22) Filed: Jul. 23, 2021

Related U.S. Application Data

(63) Continuation of application No. 16/811,885, filed on Mar. 6, 2020, now Pat. No. 11,104,437, which is a
(Continued)

(51) Int. Cl.
*B64C 39/02* (2023.01)
*G01C 21/00* (2006.01)
(Continued)

(52) U.S. Cl.
CPC .......... *B64C 39/024* (2013.01); *G01C 21/005* (2013.01); *G06F 16/29* (2019.01);
(Continued)

(58) Field of Classification Search
CPC ..... G06T 17/05; G01C 21/005; B64C 39/024; B64C 2201/123; B64C 2201/146; G06F 16/29
(Continued)

(56) References Cited

U.S. PATENT DOCUMENTS 9,763,166 B2 * 9/2017 Hyde ..................... H04W 40/00
2014/0236542 A1 * 8/2014 Abhyanker ............ G06Q 10/10
703/1
(Continued)

OTHER PUBLICATIONS

Office Action for U.S. Appl. No. 16/811,885, dated Mar. 3, 2021, Durand, "Updating Virtual Aerial Map Using Sensors Associated With Aerial Vehicles", 7 pages.

*Primary Examiner* — Christopher Braniff
(74) *Attorney, Agent, or Firm* — Lee & Hayes, P.C.

(57) ABSTRACT

A system may include a receiver configured to receive sensor data from one or more aerial vehicles, the sensor data including map data including sensed data related to an aerial view from one or more aerial vehicles of terrain and objects on the terrain. The system may also include a map updating processor in communication with the receiver. The map updating processor may receive the map data and identify a geographic location and/or an orientation associated with the map data. The map updating processor may also align, based at least in part on the geographic location and/or the orientation, the map data with a virtual aerial map providing an aerial view of terrain and objects on the terrain. The map updating processor may also incorporate at least a portion of the map data into the virtual aerial map and generate an updated virtual aerial map.

20 Claims, 5 Drawing Sheets

Related U.S. Application Data continuation of application No. 16/129,033, filed on Sep. 12, 2018, now Pat. No. 10,611,475.

(51) Int. Cl.
　　　*G06F 16/29*　　　(2019.01)
　　　*G06T 17/05*　　　(2011.01)
　　　*B64U 101/30*　　(2023.01)

(52) U.S. Cl.
　　　CPC .......... *G06T 17/05* (2013.01); *B64U 2101/30* (2023.01); *B64U 2201/20* (2023.01)

(58) Field of Classification Search
　　　USPC ................ 348/144, 143, 148, 159, 153, 135
　　　See application file for complete search history.

(56) References Cited

U.S. PATENT DOCUMENTS

| | | |
|---|---|---|
| 2014/0267393 A1 | 9/2014 | Mitchell et al. |
| 2014/0316616 A1 | 10/2014 | Kugelmass |
| 2016/0344980 A1 | 11/2016 | Davidson, Jr. et al. |
| 2019/0043214 A1 | 2/2019 | Chilcote-Bacco |
| 2019/0049949 A1 | 2/2019 | Moeller et al. |
| 2020/0143545 A1* | 5/2020 | Weng .................... B64C 39/024 |

* cited by examiner

UPDATING VIRTUAL AERIAL MAP USING SENSORS ASSOCIATED WITH AERIAL VEHICLES

CROSS-REFERENCE TO RELATED APPLICATIONS

This application is a continuation of, and claims priority to, commonly-owned U.S. patent application Ser. No. 16/811,885 filed on Mar. 6, 2020, which is a continuation of U.S. patent application Ser. No. 16/129,033 filed on Sep. 12, 2018, each of which is incorporated herein in their entirety by reference.

BACKGROUND

As the ability to widely communicate information has improved, people have become more reliant on recently updated information. For example, many people rely on virtual maps for navigation and updated traffic information. In addition, ground-borne vehicles, such as autonomous automobiles rely on accurate map information for navigation and control. However, in some instances, information may not be updated as frequently or completely as desired. For example, in relatively less-traveled areas, information related to traffic and other conditions may be relatively old and less useful. In addition, although information related to road networks may be updated relatively frequently due to information obtained from automobiles, such information is limited to information that may be obtained while travelling on the road network. Thus, information about geographic areas remote from a road network may not be readily attainable from automobiles. As a result, updated information related to such areas may be unavailable or only infrequently available.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
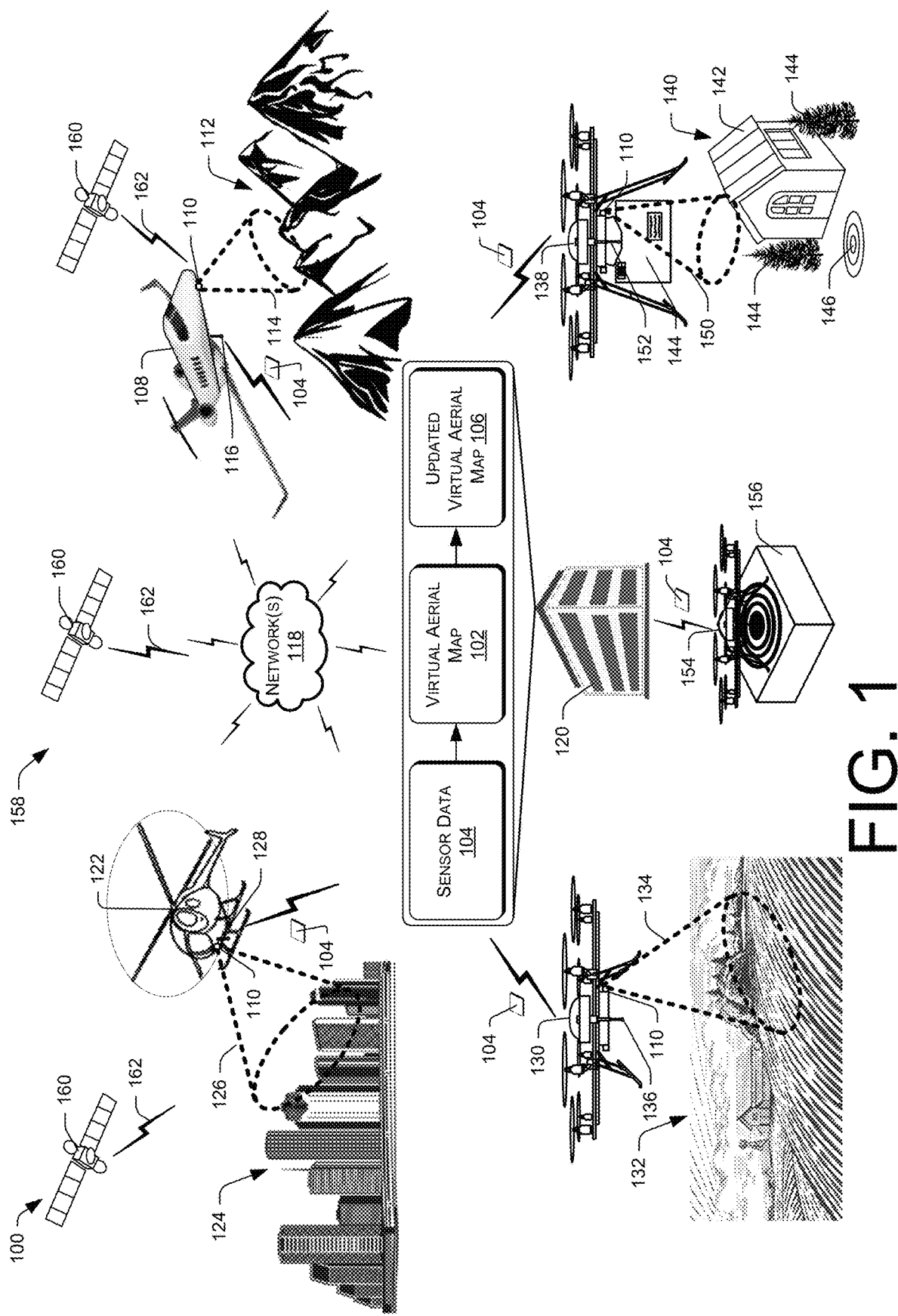
FIG. 1 illustrates an example system for updating a virtual aerial map, including several example aerial vehicles, each including sensors generating one or more signals indicative of respective environments through which respective aerial vehicles travel.

This disclosure is generally directed to systems and/or processes for updating a virtual aerial map using sensor data obtained from one or more aerial vehicles. The virtual aerial map may include information related to one or more aerial views of terrain and one or objects located on the terrain. The virtual aerial map may, in some examples, also include any information related to the geographic location corresponding to the terrain, such as, for example, traffic conditions, weather conditions, agricultural conditions (e.g., crop status), and/or any other information that may be derived from information generated by one or more sensors associated with (e.g., mounted to) one or more aerial vehicles.

Such virtual aerial maps may be useful for providing a variety of information related to particular geographic locations for a number of purposes. For example, delivery services may use traffic-related information and/or weather-related information associated with geographic regions for improving delivery time. In other examples, agricultural parties may use crop status and/or weather-related information related to particular geographic locations to improve crop yields. Emergency responders may use environment-related information, such as, for example, forest fire location, speed, and/or direction to more effectively suppress forest fires. Thus, improvements in an ability to update such virtual aerial maps, even with respect to geographic locations separated from road networks, may be beneficial to such parties and others.

For example, aerial vehicles such as manned, semi-autonomous, and autonomous aerial vehicles, each including one or more sensors configured to generate one or more sensor data signals indicative of the environment in which they travel, may generate sensor data and communicate such sensor data via one or more networks to a system configured to incorporate at least portions of the sensor data into a virtual aerial map and, in some examples, generate an updated virtual aerial map. Such vehicles may include, for example, unmanned aerial vehicles (UAVs), delivery drones, private drones of both professionals and hobbyists, air taxis, agricultural drones, manned airplanes, manned helicopters, etc. The one or more sensors may include imagers, light detection and ranging (LIDAR) sensors, and/or any other sensor types configured to generate sensor data capable of being incorporated into a virtual aerial map. In some examples, the sensor data may be communicated instantaneously (within technical limitations), or nearly-instantaneously, for example, via radio transmission to one or more networks, from at least some of the respective aerial vehicles to a system configured to update a virtual aerial map. In some examples, the aerial vehicles may be configured to communicate via one or more networks upon return to a base at which the aerial vehicle lands. For example, sensor data may be stored in memory aboard the aerial vehicle, and the stored sensor data may be downloaded once the aerial vehicle returns to the base, either directly from the memory to the system, or via one or more communication networks.

In some examples, the systems and processes may be configured to receive sensed data (e.g., the image data, the LIDAR data, etc.) included in the sensor data, and in some examples, determine whether the quality of the sensed data (e.g., one or more of the resolution, the signal noise, the signal strength, the data density, the data range, etc.) meets or exceeds a threshold data quality. If the sensed data meets or exceeds the threshold data quality, the systems and/or processes may be configured to incorporate, based at least in part on determining that the data quality meets or exceeds the threshold data quality, at least a portion of the sensed data into the virtual aerial map, and in some examples, generate an updated virtual aerial map. If the data quality is below the threshold data quality, the systems and/or processes may be configured to exclude at least a portion of the sensed data from the virtual aerial map. In this example manner, the systems and/or processes may be able to facilitate incorporation of sensed data into the virtual aerial map when received from a wide variety of types of aerial vehicles and/or sensor types, while also substantially preventing incorporation of sensed data into the map that is of inferior data quality.

Because the sensor signals are generated by aerial vehicles, the sensor data generated by sensors mounted on the aerial vehicles is not limited to information obtainable from sensors mounted on ground-borne vehicles and is not limited to information obtainable while constrained by a road network. Thus, some examples of the systems and processes may result in providing updated information about areas remote from road networks and/or information difficult to obtain from the ground. Some examples may result in information being more frequently updated, even where sensors mounted on ground-borne vehicles may be available. As a result, some examples of the systems and processes described herein may result in providing more frequent and/or more comprehensive information about environments through which aerial vehicles travel.

The techniques and systems described herein may be implemented in a number of ways. Example implementations are provided below with reference to the following figures.

FIG. 1 illustrates an example system 100 for updating a virtual aerial map 102 using sensor data 104 obtained from one or more sensors associated with (e.g., mounted to) one or more aerial vehicles to generate an updated virtual aerial map 106, as explained herein. For example, a plurality of aerial vehicles may be operated in the same or different environments, and the aerial vehicles may each have one or more sensors associated with the respective aerial vehicles. The sensors may be configured to generate sensor data including map data related to an aerial view from the respective aerial vehicle of terrain and/or objects on the terrain over which the aerial vehicle maneuvers. The map data may include data indicative of any information related to the geographic area based on which the sensor data is generated, including but not limited to, for example, information related to the geography of the geographic area, information related to the topography of the geographic area, information related to objects (e.g., machines, structures, vegetation, animals, and people) in the geographic area, a road or road network in the geographic area, information related to agriculture (e.g., crop status) in the geographic area, etc. The aerial vehicles may include any aerial vehicles capable of carrying one or more sensors configured to generate sensor data indicative of terrain over which the aerial vehicle maneuvers, such as, for example, manned aerial vehicles, semi-autonomous aerial vehicles, autonomous aerial vehicles, fixed-wing aerial vehicles, multicopters, helicopters, vertical take-off and landing (VTOL) aerial vehicles, military aerial vehicles, gliders, ultralights, or any other type of aerial vehicle. The sensors may include one or more imagers including, for example, RGB-cameras, monochrome cameras, intensity (grey scale) cameras, infrared cameras, ultraviolet cameras, depth cameras, video cameras, or stereo cameras, one or more LIDAR sensors, which may be any type of LIDAR-based sensor, and any other types of sensors configured to generate sensor data that could be incorporated into the virtual aerial map. The system 100, in some examples, may be operated and/or controlled by one or more third party entities, either related or unrelated to entities operating and/or controlling the one or more aerial vehicles.

FIG. 1 schematically depicts an example first aerial vehicle 108 (e.g., an example fixed-wing aerial vehicle) including one or more sensors 110 configured to generate sensor data 104 including map data related to an aerial view from the first aerial vehicle 108 of an example mountainous terrain 112 and/or objects on the mountains terrain 112 over which the first aerial vehicle 108 maneuvers. For example, the example sensor 110 may have a field of view 114 directable at the example mountainous terrain 112, and the sensor 110 may be configured to generate sensor data representative of a portion of the mountainous terrain 112 within the field of view 114 of the sensor 110. The example first aerial vehicle 108 shown includes a transmitter 116 configured to transmit the sensor data 104 from the first aerial vehicle 108 via one or more network(s) 118 to one or more processors at a location 120 remote from the first aerial vehicle 108, which may use at least a portion of the sensor data 104 to update the virtual aerial map 102 and/or generate an updated virtual aerial map 106, except as noted herein. The network(s) 118 may facilitate such communications/interactions via any type of network, such as a public wide-area-network (WAN) (e.g., the Internet), which may utilize various different technologies including wired and wireless technologies.

As shown in FIG. 1, an example second aerial vehicle 122 (e.g., a helicopter) includes one or more sensors 110 configured to generate sensor data 104 including map data related to an aerial view from the second aerial vehicle 122 of example urban terrain 124 and/or objects on the urban terrain 124, such as buildings and objects typically found in urban settings. The example sensor 110 may have a field of view 126 directable at the example urban terrain 124, and the sensor 110 may be configured to generate sensor data representative of a portion of the urban terrain 124 within the field of view 126 of the sensor 110. The example second aerial vehicle 122 shown includes a transmitter 128 configured to transmit the sensor data 104 from the second aerial vehicle 122 via the one or more networks 118 to one or more processors at the location 120, which may be remote from the second aerial vehicle 122, which may use at least a portion of the sensor data 104 to update the virtual aerial map 102 and/or generate the updated virtual aerial map 106, except as noted herein.

Similarly, FIG. 1 also shows an example third aerial vehicle 130 (e.g., a manned or unmanned multicopter) including one or more sensors 110 configured to generate sensor data 104 including map data related to an aerial view from the third aerial vehicle 130 of example agricultural terrain 132 and/or objects on the agricultural terrain 132, such as crops, farm animals, related buildings and machines, and/or other objects typically found in agricultural settings. The example sensor 110 may have a field of view 134 directable at the example agricultural terrain 132, and the sensor 110 may be configured to generate sensor data representative of a portion of the agricultural terrain 132 within the field of view 134 of the sensor 110. The example third aerial vehicle 130 shown includes a transmitter 136 configured to transmit the sensor data 104 from the third aerial vehicle 130 via the one or more networks 118 to one or more processors to the location 120, which may be remote form the third aerial vehicle 130, and which may use at least a portion of the sensor data 104 to update the virtual aerial map 102 and/or generate the updated virtual aerial map 106, except as noted herein.

FIG. 1 also depicts an example fourth aerial vehicle 138 (e.g., a manned or unmanned multicopter) including one or more sensors 110 configured to generate sensor data 104 including map data related to an aerial view from the fourth aerial vehicle 138 of example neighborhood terrain 140 and/or objects on the neighborhood terrain 140, such as a house 142, trees 144, and a drop-off zone 146 for deliveries. For example, the example fourth aerial vehicle 138 shown carries a package 148 for delivery to the house 142 at the example drop-off zone 146. The example sensor 110 may have a field of view 150 directable at the example neighborhood terrain 140, and the sensor 110 may be configured to generate sensor data representative of a portion of the neighborhood terrain 140 within the field of view 150 of the sensor 110. The example fourth aerial vehicle 138 shown includes a transmitter 152 configured to transmit the sensor data 104 from the fourth aerial vehicle 138 via the one or more networks 118 to one or more processors, which may use at least a portion of the sensor data 104 to update the virtual aerial map 102 and/or generate an updated virtual aerial map 106, except as noted herein.

FIG. 1 also shows an example fifth aerial vehicle 154 (e.g., a manned or unmanned multicopter) at an example base station 156. In some examples, the aerial vehicles may not be capable of transmitting information directly from the aerial vehicle to the network(s) 118. Rather, in some examples, the aerial vehicles may return to a base station at which they land and/or receive service (e.g., power, maintenance, etc.), and at the base station, the aerial vehicle may communicate information including the sensor data 104 stored in memory of the aerial vehicle via the base station to the location 120 of the one or more processors. In some such examples, the base station 156 may include a transmitter configured to transmit the sensor data 104 via the one or more network(s) 118.

Although the example first through fourth aerial vehicles 108, 122, 130, and 138 are shown as each maneuvering and generating sensor data individually and related to a single environment, more than one aerial vehicle may concurrently maneuver and generate sensor data in the one or more environments. For example, some examples of the system 100 may leverage sensor data generated intermittently or continuously by more than a single aerial vehicle in a given geographic area, which may, in some examples, result in near continuous updating of the virtual aerial map 102 associated with the given geographic area.

In some examples, the system 100 may be configured to receive from one or more of the aerial vehicles the sensor data 104 including the sensed data (e.g., image data, LIDAR data, and/or other data representative of the environment through which the aerial vehicle maneuver), and in some examples, the system 100 may be configured to determine whether the quality of the sensed data (e.g., one or more of the resolution, the signal noise, the signal strength, the data density, the data range, etc.) meets or exceeds a threshold data quality. If the sensed data meets or exceeds the threshold data quality, the system 100 may be configured to incorporate, based at least in part on determining that the data quality meets or exceeds the threshold data quality, at least a portion of the sensed data into the virtual aerial map 102, and in some examples, generate an updated virtual aerial map 106. If the data quality is below the threshold data quality, in some examples, the system 100 may be configured to exclude at least a portion of the sensed data from the virtual aerial map 102 (e.g., the system 100 may not incorporate at least a portion of the sensed data). In this example manner, the system 100 may be able to facilitate incorporation of sensed data into the virtual aerial map 102 when received from a wide variety of types of aerial vehicles and/or sensor types, while also substantially preventing incorporation of sensed data into the map that is of inferior data quality.

In some examples, the threshold data quality may be empirically determined and/or adjusted over time as the quality of the data encompassing the virtual aerial map 102 improves over time. In some examples, the threshold data quality may be based at least in part on geographic location in the virtual aerial map 102 and/or the quality of the data in the virtual aerial map 102 at the geographic location. For example, if at a certain geographic location in the virtual aerial map 102 the quality of the existing data is at a certain level, the system 100 may be configured to determine whether the quality of the sensed data received from an aerial vehicle is improved relative to the existing data already in the virtual aerial map 102, and if so, incorporate the sensed data from the aerial vehicle into the virtual aerial map 102. If the quality of the sensed data received from the aerial vehicle is below the level of quality of the existing data, then the system 100 may be configured to exclude at least a portion of the sensed data received from the aerial vehicle.

In some examples, the virtual aerial map 102 may be updated with the sensor data 104 using, for example, sensed data stitching techniques. For example, one or more algorithms may be used to relate data points (e.g., pixels) in the sensor data 104 (e.g., sensed data) to data points in an existing virtual aerial map 102. In some examples, one or more features from the terrain and/or objects on the terrain represented in the sensor data 104 may be matched with one or more corresponding features in the virtual aerial map 102. In some such examples, at least some portions of the sensor data 104 may be incorporated into the virtual aerial map 102 using one or more algorithms that blend at least a portion of the sensor data 104 into the virtual aerial map 102. Other techniques for incorporating the sensor data 104 into the virtual aerial map 102 are contemplated.

As shown in FIG. 1, the geographic location, orientation, and/or navigation of one or more of the aerial vehicles may be assisted by a global positioning system (GPS) 158, which may include a plurality of GPS satellites 160 sending GPS signals 162, which may be used by one or more of the aerial vehicles to assist with determining one or more of the geographic location and/or orientation of the aerial vehicle, and/or to assist with navigation and/or control of the aerial vehicle. It is contemplated that one or more of the aerial vehicles may use other known navigation technologies for determining one or more of the geographic location and/or orientation, and/or to assist with navigation, such as, for example, dead-reckoning, image-aided navigation, inertial measurement units, gyroscopes, and/or accelerometers.

Figure 2:
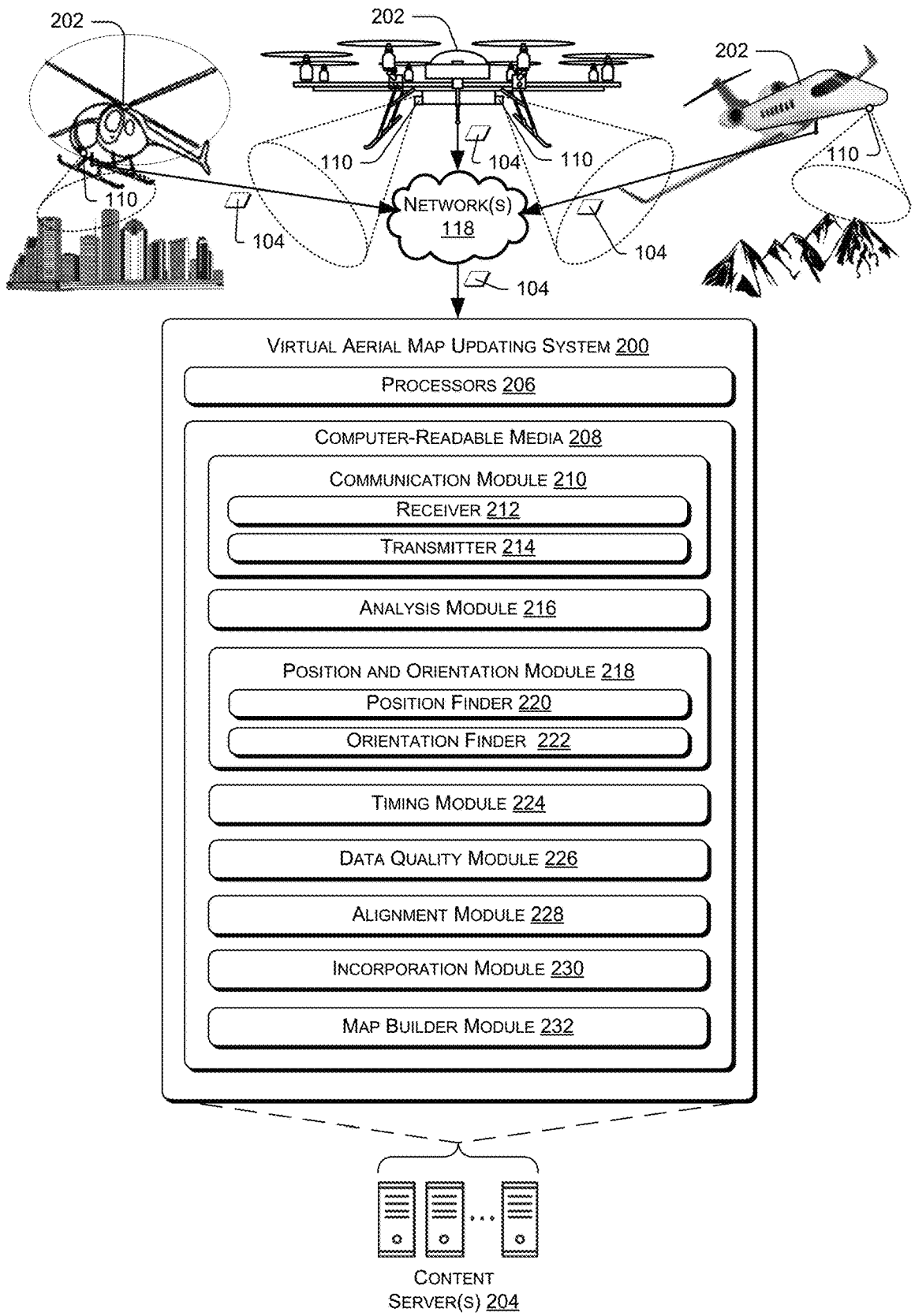
FIG. 2 illustrates an example system for updating a virtual aerial map.

FIG. 2 illustrates an example virtual aerial map updating system 200, which may correspond to the example system 100 shown in FIG. 1. The example virtual aerial map updating system 200 may be configured to receive sensor data 104 via the one or more network(s) 118 from one or more aerial vehicles 202 and, based at least in part on the sensor data 104, update a virtual aerial map 102 and generate an updated virtual aerial map 106, for example, as explained with respect to FIG. 1. Although the example aerial vehicles 202 depicted in FIG. 2 are multicopters, as noted previously herein, the aerial vehicles may be any type of aerial vehicle. In the example shown in FIG. 2, the virtual aerial map updating system 200 includes one or more content server(s) 204. The network(s) 118 may facilitate such communications/interactions via any type of network, such as a public wide-area-network (WAN) (e.g., the Internet), which may utilize various different technologies including wired and wireless technologies. Moreover, the content server(s) 204 may contain any number of servers that are possibly arranged as a server farm. Other server architectures may also be used to implement the content server(s) 204. As shown, the content server(s) 204 include the one or more processor(s) 206, and computer-readable media 208. In the example shown, the computer-readable media 208 includes a communication module 210 including a receiver 212 and a transmitter 214, an analysis module 216, a position and orientation module 218 including a position finder 220 and an orientation finder 222, a timing module 224, a data quality module 226, an alignment module 228, an incorporation module 230, and a map builder module 232.

The one or more processors 206 may execute the one or more of the above-noted modules and/or processes to cause the virtual aerial map updating system 200 and/or the content servers 204 to perform a variety of functions, as set forth above and explained in further detail herein. In some examples, the processor(s) 206 may include a central processing unit (CPU), a graphics processing unit (GPU), both CPU and GPU, or other processing units or components known in the art. Additionally, each of the processors 206 may possess its own local memory, which also may store program modules, program data, and/or one or more operating systems.

The computer-readable media 208 may include volatile memory (e.g., RAM), non-volatile memory (e.g., ROM, flash memory, miniature hard drive, memory card, or the like), or some combination thereof. The computer-readable media 208 may be non-transitory computer-readable media. The computer-readable media 208 may include or be associated with the one or more of the above-noted modules, which perform various operations associated with the virtual aerial map updating system 200 and/or content server(s) 204. In some examples, one or more of the above-noted modules may include or be associated with computer-executable instructions that are stored by the computer-readable media 208 and that are executable by the one or more processors 206 to perform such operations. The virtual aerial map updating system 200 and/or the content server(s) 204 may also include additional components not listed above that may perform any function associated with the virtual aerial map updating system 200 and/or the content server(s) 204.

In some examples, the communication module 210 may be configured to facilitate communication of data between one or more aerial vehicles 202 and the virtual aerial map updating system 200. For example, the communication module 210 may include a receiver 212 configured to receive one or more signals from one or more of the aerial vehicles 202 via, for example, the one or more network(s) 118. Such signals may include the sensor data 104 from one or more sensors 110 associated with (e.g., mounted to) the aerial vehicles 202. In some examples, for example, as shown in FIG. 2, the communications module 210 may include a transmitter 214 configured to transmit one or more signals. For example, continuously or intermittently, as the system updates the virtual aerial map 102, the system may transmit an updated virtual aerial map 106, for example, via the one or more network(s) 118. Transmission of other data available to the virtual aerial map updating system 200 is also contemplated. In some examples, the receiver 212 and the transmitter 214 may take the form of a transceiver.

In some examples, the analysis module 216 may be configured to identify and/or extract sensed data from the sensor data 104 received from the aerial vehicles 202. For example, the sensor data 104 may include data other than the sensed data, for example, as described herein. The analysis module 216 may be configured to identify the sensed data and in some embodiments, preform image analysis techniques on the sensed data, for example, to extract more information from the sensed data. For example, the analysis module 216 may be configured to perform one or more of two-dimensional or three-dimensional object recognition, image segmentation, motion detection, video tracking, optical flow, three-dimensional position and/or orientation estimation, etc. For example, the sensed data may be segmented and/or objects in the sensed data may be classified, for example, according to known image-analysis techniques to identify features and/or objects in the sensed data. Sensed data may include any data related to images and/or point clouds generated by imagers, LIDAR sensors, and/or any other types of sensors configured to generate signals indicative of an environment that may be incorporated into the virtual aerial map 102. Such objects and features identified by the analysis module 216 may include, for example, topography of terrain, vegetation and/or its condition, buildings, bridges, vehicles, traffic flow, road conditions, construction zones, weather conditions, crop status, locations of vehicles in a fleet of vehicles, locations of machines and people at a work-site, etc.

The example shown in FIG. 2 also includes a position and orientation module 218 configured to determine geographic location and/or orientation of the sensor from which the sensor data 104 is received. In some examples, the sensor data 104 itself (e.g., the one or more signals including the sensor data 104) may include the geographic location and/or orientation corresponding to the sensor data 104. In such examples, the position and orientation module 218 may be configured to identify and/or extract the geographic location and/or orientation from the sensor data 104. For example, the geographic location may correspond to the north east down (NED) position of the aerial vehicle 202 and/or the sensors 110, where the NED position is represented by three coordinate values corresponding respectively to the position along the northern axis, the position along the eastern axis, and the position along the vertical axis. As used herein, the position may refer to one or more of the three axis positions. Orientation may correspond to the pitch, roll, and/or yaw about the three axis positions of the aerial vehicle 202 and/or the sensors 110. The geographic location and/or the orientation may be used to align the sensor data 104 with data in the virtual aerial map 102, for example, in order to incorporate the sensor data 104 into the virtual aerial map 102, as described herein. In some examples, the sensor data 104 may not include the geographic location and/or orientation. In some examples, the position and orientation module 218 may include one or more of a position finder 220 or an orientation finder 222. In such examples, the position finder 220 and/or the orientation finder 222 may be configured to determine the geographic location and/or orientation related to the sensor data 104. For example, the position finder 220 and/or the orientation finder 222 may be configured to determine the geographic location and/or orientation based at least in part on sensed data in the sensor data 104, for example, according to known techniques, such as, for example, simultaneous localization and mapping (SLAM) and/or other techniques.

The example shown in FIG. 2 also includes a timing module 224 configured to determine a time associated with the sensor data 104, for example, the absolute time at which the sensed data associated with the sensor data 104 was generated or captured by the one or more sensors 110. In some examples, the sensor data 104 itself (e.g., the one or more signals including the sensor data 104) may include the time associated with the sensor data 104. In such examples, the timing module 224 may be configured to identify and/or extract the time from the sensor data 104. In some examples, the sensor data 104 may not include the time. In such examples, the timing module 224 may determine the time at which the sensor data 104 was received by the virtual aerial map updating system 200. The time associated with the sensor data 104 may be used to prioritize more recently received sensor data 104 over less recently received sensor data 104, for example, with respect to determining whether to update the virtual aerial map 102 based on the sensor data 104. For example, the virtual aerial map updating system 200 may discount or not use sensor data 104 that is less recent than other sensor data 104 that is more recent, for example, to the extent that sensor data 104 associated with a geographic location conflicts. The virtual aerial map updating system 200 may be configured to use the more recent sensor data 104 for updating the virtual aerial map 102, unless, for example, some other attribute of the more recent sensor data 104 might indicate that it is relatively less reliable than the less recent sensor data 104. For example, the more recent sensor data 104 may not have as high a resolution as the less recent sensor data 104, and the differences between the more recent sensor data 104 and the less recent sensor data 104 may be attributed, at least in part, to the difference in resolution.

For example, some examples of the virtual aerial map updating system 200 may include a data quality module 226 configured to determine the relative quality (e.g., data indicative of one or more of the resolution, the signal noise, the signal strength, the data density, the data range, etc.) of the sensor data 104 (e.g., the sensed data). In some examples, the sensor data 104 itself (e.g., the one or more signals including the sensor data 104) may include the data quality (e.g., the resolution) associated with the sensor data 104. In such examples, the data quality module 226 may be configured to identify and/or extract the data quality from the sensor data 104. In some examples, the sensor data 104 may not include the data quality, and in some examples, the data quality module 226 may determine the data quality of the sensor data 104. The data quality, in some examples, may be used to prioritize relatively higher quality sensor data 104 over relatively lower quality sensor data 104, for example, with respect to determining whether to update the virtual aerial map 102 based on the sensor data 104. For example, the virtual aerial map updating system 200 may discount or not use sensor data 104 that has a lower quality, for example, to the extent that sensor data 104 associated with a geographic location conflicts. The virtual aerial map updating system 200 may be configured to use the higher quality sensor data 104 for updating the virtual aerial map 102, unless, for example, some other attribute of the higher quality sensor data 104 might indicate that it is relatively less reliable than lower quality sensor data 104. For example, the more recent sensor data 104 having a lower quality may include additional objects or changes that is not included in the higher quality sensor data 104.

In some examples, the data quality module 226 may be configured to receive from one or more of the aerial vehicles 202 the sensor data 104 including the sensed data (e.g., image data, LIDAR data, and/or other data representative of the environment through which the aerial vehicle maneuvers), and determine whether the quality of the sensed data (e.g., one or more of the resolution, the signal noise, the signal strength, the data density, the data range, etc.) meets or exceeds a threshold data quality, for example, as explained previously herein. If the sensed data meets or exceeds the threshold data quality, the data quality module 226 may be configured to incorporate, based at least in part on determining that the data quality meets or exceeds the threshold data quality, at least a portion of the sensed data into the virtual aerial map 102, and in some examples, generate an updated virtual aerial map 106. If the data quality is below the threshold data quality, in some examples, the system 100 may be configured to exclude at least a portion of the sensed data from the virtual aerial map 102 (e.g., the system 100 may not incorporate at least a portion of the sensed data). In this example manner, the system 100 may be able to facilitate incorporation of sensed data into the virtual aerial map 102 when received from a wide variety of types of aerial vehicles and/or sensor types, while also substantially preventing incorporation of sensor data into the map that is of inferior data quality.

As shown in FIG. 2, some examples of the virtual aerial map updating system 200 may also include an alignment module 228 configured to align the sensor data 104 (e.g., the sensed data (e.g., image data and/or point cloud data) in the sensor data 104) with existing data in the virtual aerial map 102. For example, sensor data 104 associated with a particular geographic location, in order to be incorporated into the virtual aerial map 102, may be incorporated at the correct geographic location and/or orientation in the virtual aerial map 102. The alignment module 228 may align the sensor data 104 with the data in the virtual aerial map 102 according to known alignment techniques. For example, one or more algorithms may be used to relate data points (e.g., pixels) in the sensor data 104 (e.g., sensed data) to data points in an existing virtual aerial map 102. In some examples, one or more features from the terrain and/or objects on the terrain represented in the sensor data 104 may be matched with one or more corresponding features in the virtual aerial map 102.

Once the sensor data 104 (e.g., the sensed data) has been aligned with the data in the virtual aerial map 102, the virtual aerial map updating system 200 may include an incorporation module 230 configured to incorporate the sensor data 104 into the virtual aerial map 102, for example, according to known techniques. Once the sensor data 104 has been incorporated into the virtual aerial map 102, the virtual aerial map updating system 200 may include a map builder module 232 configured to generate an updated virtual aerial map 106, for example, according to known techniques. For example, the virtual aerial map 102 may be updated with the sensor data 104 using, for example, sensed data stitching techniques. One or more algorithms may be used to relate data points (e.g., pixels) in the sensor data 104 (e.g., sensed data) to data points in an existing virtual aerial map 102. In some examples, one or more features from the terrain and/or objects on the terrain represented in the sensor data 104 may be matched with one or more corresponding features in the virtual aerial map 102. In some such examples, at least some portions of the sensor data 104 may be incorporated into the virtual aerial map 102 using one or more algorithms that blend at least a portion of the sensor data 104 into the virtual aerial map 102. Other techniques for incorporating the sensor data 104 into the virtual aerial map 102 are contemplated.

Figure 3:
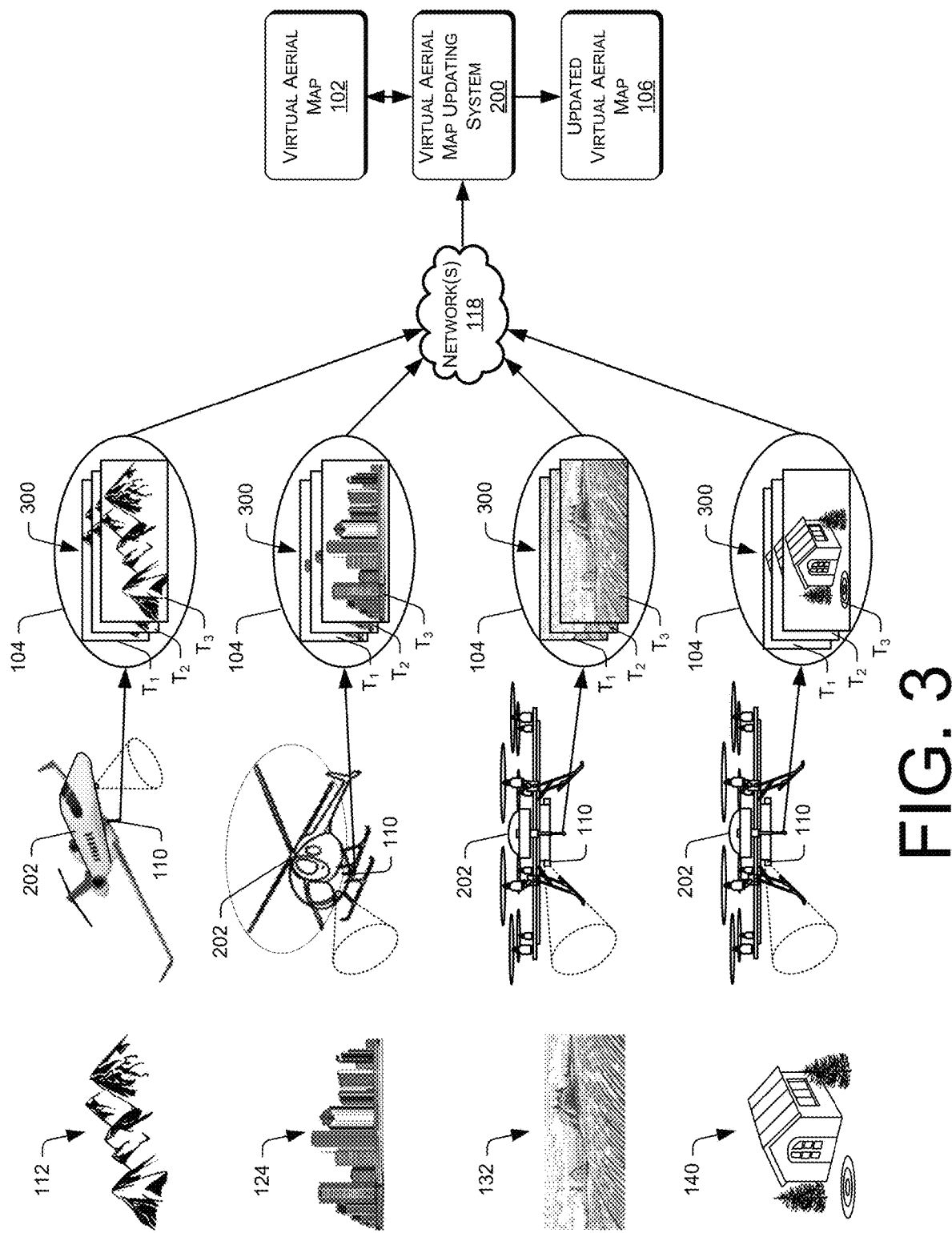
FIG. 3 illustrates an example flow of information between example aerial vehicles and a virtual aerial map updating system.

FIG. 3 illustrates an example flow of information between example aerial vehicles 202 and an example virtual aerial map updating system 200, which may correspond to the system 100 shown in FIG. 1. In the examples shown, one or more sensors 110 associated with the aerial vehicles 202 capture, receive, and/or generate sensor data 104 including sensed data 300 associated with a time at which the sensor data 104 is generated (or captured or received). For example, as shown the sensed data 300 may be generated at times $T_1$, $T_2$, $T_3$, and so on, and the sensed data 300 associated with one or more of the times may be communicated via the one or more network(s) 118 to the virtual aerial map updating system 200. The virtual aerial map updating system 200 may access the virtual aerial map 102, which may be stored locally or remotely in memory, and the virtual aerial map updating system 200 may incorporate at least portions of the sensor data 104 into the virtual aerial map 102 (e.g., into the most recently updated version of the virtual aerial map 102) and generate an updated virtual aerial map 106, for example, as described herein. For example, as shown in FIG. 3, one or more of the aerial vehicles 202 may be maneuvering above one or more of mountainous terrain 112, an urban terrain 124, an agricultural terrain 132, or a neighborhood terrain 140, and one or more sensors 110 associated with the respective aerial vehicles 202 may be generating sensor data 104, including, for example, the sensed data 300, which may be communicated via the one or more network(s) 118 to the virtual aerial map updating system 200, for example, as described herein.

Figure 4:
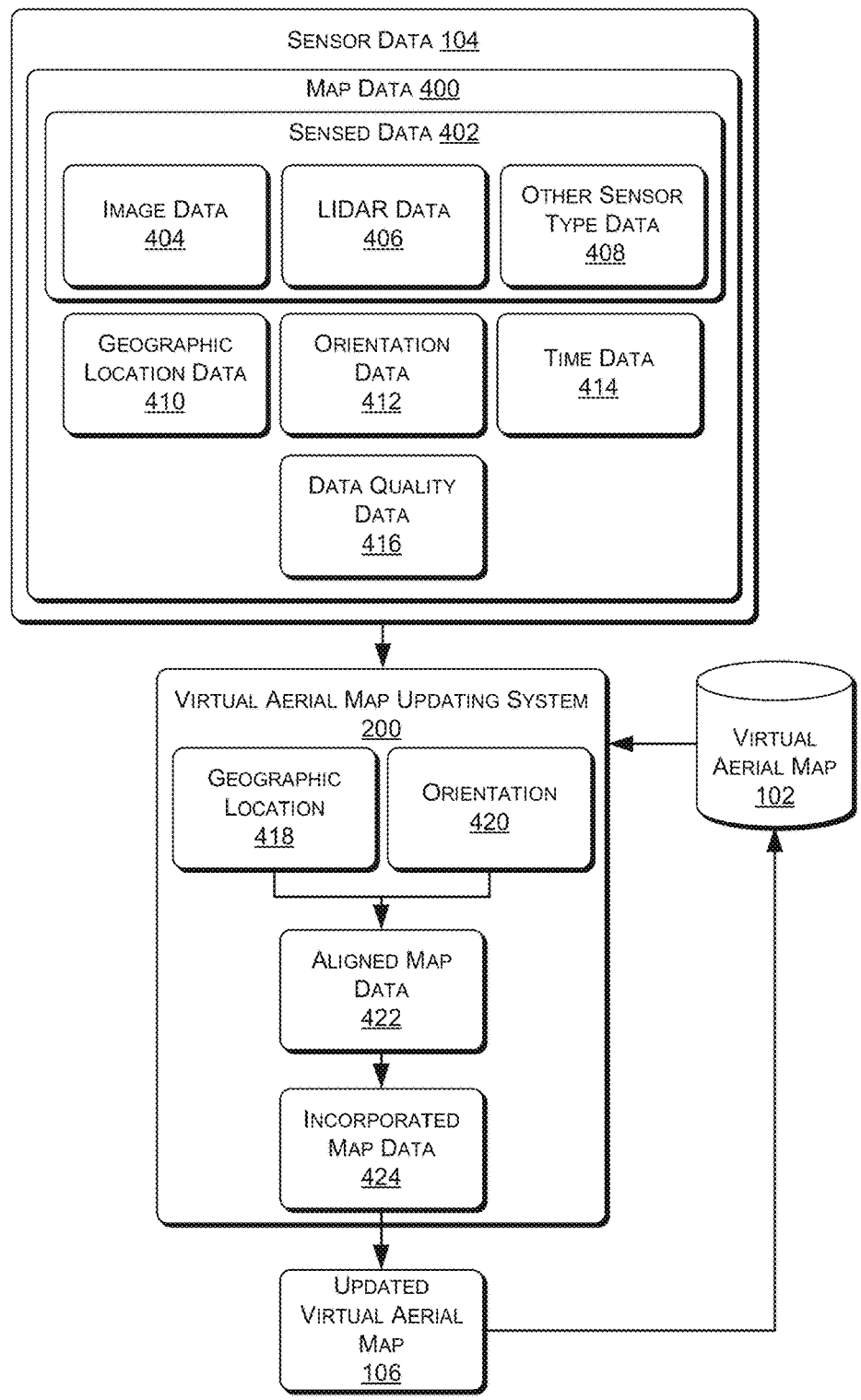
FIG. 4 illustrates an example of sensor data input into an example virtual aerial map updating system to generate an example updated virtual aerial map.

FIG. 4 illustrates an example of sensor data 104 input into an example virtual aerial map updating system 200 to generate an example updated virtual aerial map 106. As shown in FIG. 4, in some examples, the sensor data 104 generated by the one or more sensors 110 associated with the one or more aerial vehicles may include map data 400. The map data 400 may include sensed data 402, which may be incorporated into the virtual aerial map 102. The sensed data 402 may correspond to the sensed data 300 shown in FIG. 3. For example, the sensed data 402 may include one or more of image data 404 generated by an imager, LIDAR data 406 generated by a LIDAR sensor, or other sensor type data 408, generated by sensor types other than an imager or a LIDAR sensor. In some examples, an imager may include one or more of RGB-cameras, monochrome cameras, intensity (grey scale) cameras, infrared cameras, ultraviolet cameras, depth cameras, video cameras, or stereo cameras. The LIDAR sensor may be any type of LIDAR-based sensor, and the other sensor type may be any sensor type configured to generate sensor data that could be incorporated into the virtual aerial map 102.

In some examples, the map data 400 may also include one or more of geographic location data 410, orientation data 412, time data 414, or data quality data 416. The location data 410 and/or the orientation data 412 may provide the geographic location and/or orientation of a sensor 110 by which corresponding sensed data 402 was generated. For example, the aerial vehicle 202 (see FIG. 2) on which the sensor 110 is mounted may have a navigation and/or control system that determines and updates the geographic location and/or orientation of the aerial vehicle 202. For example, the aerial vehicle 202 may include a GPS receiver configured to receive GPS signals 162 from three or more GPS satellites 160 (see FIG. 1) and determine its geographic location, which may be included in geographic location data 410 and incorporated into the sensor data 104 communicated to the virtual aerial map updating system 200. In some examples, the aerial vehicle 202 may have additional navigational and control systems, for example, configured to determine the orientation of the aerial vehicle 202 and/or one or more of the sensors 110 it carries. This information may also be included in orientation data 412, which may be incorporated into the sensor data 104 communicated from the aerial vehicle 202 to the virtual aerial map updating system 200. In some examples, as mentioned above with respect to FIG. 2, the virtual aerial map updating system 200 may be configured to determine the geographic location data 410 and/or the orientation data 412 based, at least in part, on the sensed data 402, for example, using the position and orientation module 218, including the position finder 220 and orientation finder 222.

The time data 414 may be included in the sensor data 104 communicated to the virtual aerial map updating system 200. For example, the aerial vehicle 202 may include an internal clock and may determine the time (e.g., a timestamp) at which the sensor data 104 (e.g., the sensed data 402) is captured, received, and/or generated by the one or more sensors 110, and the time data 414 may be incorporated into the sensor data 104 communicated to the virtual aerial map updating system 200. In some examples, the time data 414 may be determined by the virtual aerial map updating system 200 (e.g., by the timing module 224) based, for example, on the time at which the virtual aerial map updating system 200 receives the sensor data 104. Similarly, the data quality data 416 may be included in the sensor data 104 communicated to the virtual aerial map updating system 200. In some examples, the data quality data 416 may be determined by the virtual aerial map updating system 200 (e.g., by the data quality module 226) based, for example, on the sensed data 402.

As shown in FIG. 4, the sensor data 104 may be received by the virtual aerial map updating system 200, and the virtual aerial map updating system 200 may determine the geographic location 418 and/or the orientation 420 associated with the sensor data 104, for example, as described above. The virtual aerial map updating system may also access the latest version of the virtual aerial map 102, which may be stored in memory of the virtual aerial map updating system 200 or in memory remote from the virtual aerial map updating system 200. As described herein, the alignment module 228 (FIG. 2) may align the sensor data 104 (e.g., the sensed data 402) received from an aerial vehicle 202 with the virtual aerial map 102 to create aligned map data 422. For example, the alignment module 228 may use the geographic location 418 and/or the orientation 420 as inputs for one or more algorithms that relate data points (e.g., pixels) in the sensor data 104 (e.g., sensed data) to data points in the virtual aerial map 102. In some examples, one or more features from the terrain and/or objects on the terrain represented in the sensor data 104 may be matched with one or more corresponding features in the virtual aerial map 102.

In some examples, thereafter the incorporation module 230 (FIG. 2) may incorporate the aligned map data 422 into the virtual aerial map 102 creating incorporated map data 424. In some examples, the incorporation module 230 may use sensed data stitching techniques. For example, once the aligned map data 422 has been determined, one or more algorithms may be used to blend at least a portion of the aligned map data 422 into the virtual aerial map 102. Other techniques for incorporating the sensor data 104 into the virtual aerial map 102 are contemplated. In some examples, the incorporated map data 424 may be used by the map builder 232 (FIG. 2) of the virtual aerial map updating system 200 to generate an updated virtual aerial map 106, for example, by replacing the virtual aerial map 102 in its form prior to the updating with an updated virtual aerial map 106 including the incorporated map data 424. In some examples, the updated virtual aerial map 106 may be stored in memory, either in addition to the virtual aerial map 102 or as a replacement for the virtual aerial map 102. In some examples, only differences between updated virtual aerial map 106 and the virtual aerial map 102 may be determined, and only the differences may be stored and/or replaced.

Figure 5:
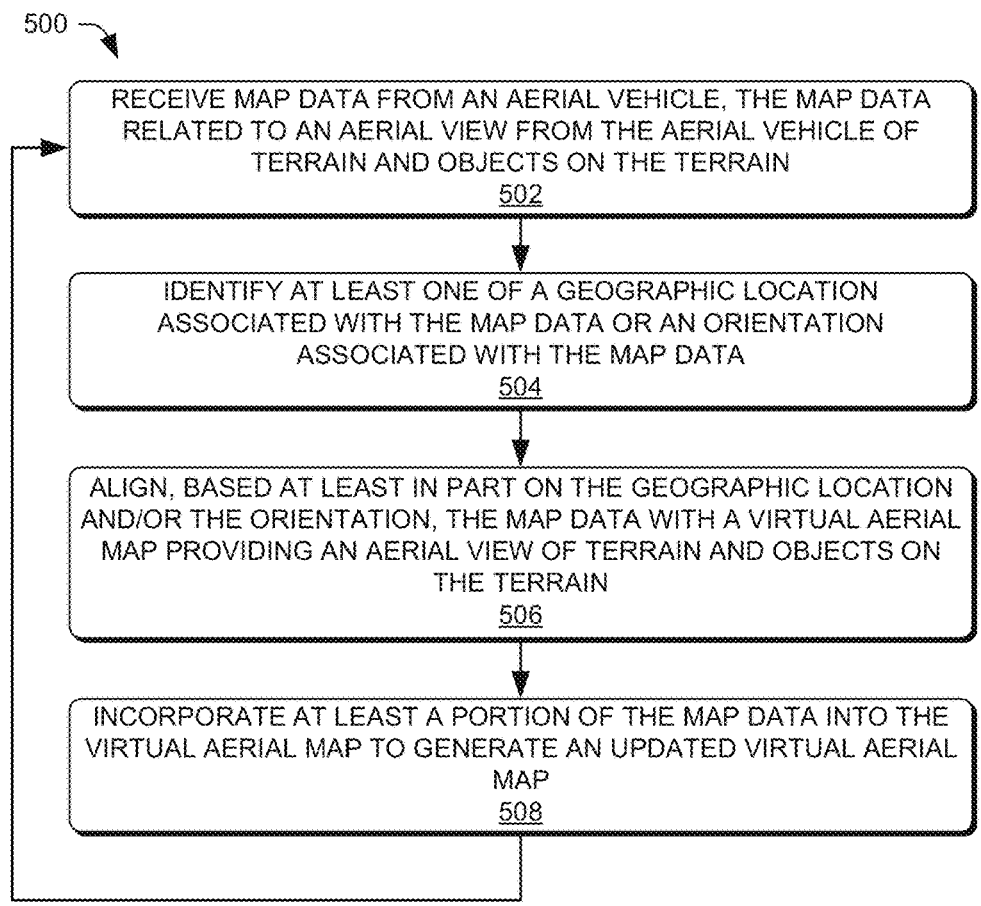
FIG. 5 illustrates an example process for updating a virtual aerial map.

FIG. 5 illustrates an example process for updating a virtual aerial map using sensor data from one or more sensors associated with one or more aerial vehicles. This process is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 5 illustrates a flow diagram of an example process 500 for updating a virtual aerial map using sensor data from one or more sensors associated with one or more aerial vehicles, for example, as described herein. The following actions described with respect to FIG. 5 may be performed by the virtual aerial map updating system 200 and/or the content server(s) 204, for example, as illustrated with respect to FIGS. 1-4.

The example process 500, at 502, may include receiving map data from an aerial vehicle, the map data related to an aerial view from the aerial vehicle of terrain and objects on the terrain. For example, the map data may include at least one of image-based data or laser-based data received from the aerial vehicle, for example, as described herein.

At 504, the process 500, in some examples, may include identifying at least one of a geographic location associated with the map data or an orientation associated with the map data. In some examples, this may include determining the geographic location and/or the orientation based at least in part on the map data. In some examples, the map data may include the geographic location and/or the orientation, and in some examples, the process 500 may include determining the geographic location and/or the orientation based at least in part on the sensed data, for example, as described herein.

Some examples of the process 500 may include determining whether the quality of the sensor data (e.g., one or more of the resolution, the signal noise, the signal strength, the data density, the data range, etc.) meets or exceeds a threshold data quality. If the sensed data does not meet or exceed the threshold data quality, the process 500, in some examples, may include excluding at least a portion of the sensed data from the virtual aerial map (e.g., the process 500 may not incorporate at least a portion of the sensed data, for example, the process 500 may not incorporate any of the sensed data received from the aerial vehicle into the virtual aerial map). In this example manner, the process 500 may be able to substantially prevent incorporation of sensed data into the map that is of inferior data quality. If, however, it is determined that the sensed data meets or exceeds the threshold data quality, the process 500 may continue, for example, as outlined herein.

At 506, the process 500 may include aligning, based at least in part on the geographic location and/or the orientation, the map data with a virtual aerial map providing an aerial view of terrain and objects on the terrain, for example, as described herein.

The example process 500 may also include, at 508, incorporating at least a portion of the map data into the virtual aerial map to generate an updated virtual aerial map, for example, as described herein.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, from one or more unmanned aerial vehicles (UAVs), map data associated with a geographic location;
determining at least one of a time associated with the map data or a quality associated with the map data; and
determining, based at least in part on the at least one of the time or the quality, whether to use the map data to generate or update a virtual aerial map associated with the geographic location.

2. The method as recited in claim 1, further comprising determining that the time is subsequent to a second time in which the virtual aerial map was generated or last updated.

3. The method as recited in claim 1, further comprising determining that the quality exceeds at least one of a second quality associated with the virtual aerial map or a threshold data quality.

4. The method as recited in claim 1, wherein the map data includes at least one of one or more images or one or more videos that visually depict the geographic location.

5. The method as recited in claim 1, wherein the virtual aerial map depicts roads and structures associated with the geographic location.

6. The method as recited in claim 1, further comprising generating or updating the virtual aerial map based at least in part on the map data.

7. A method comprising:
determining, based at least in part on image data captured by one or more unmanned aerial vehicles (UAVs), map data associated with one or more geographic locations;
determining an existing virtual map associated with the one or more geographic locations; and
one of:
updating the existing virtual map based at least in part on the map data; or
utilizing the map data to generate a new existing virtual map that corresponds to the existing virtual map.

8. The method as recited in claim 7, wherein the image data includes at least one of one or more images or one or more videos that are captured by one or more cameras mounted to the one or more UAVs, and wherein the at least one of the one or more images or the one or more videos depict at least one of structures, traffic conditions, weather conditions, or agricultural conditions associated with the one or more geographic locations.

9. The method as recited in claim 7, wherein the one or more UAVs include a first UAV and a second UAV, wherein the image data includes first image data captured by the first UAV and second image data captured by the second UAV, and further comprising selecting one of the first image data or the second image data to generate the map data.

10. The method as recited in claim 7, further comprising determining that a time in which the image data was captured by the one or more UAVs is subsequent to a second time in which the existing virtual map was generated or last updated.

11. The method as recited in claim 7, further comprising determining that a quality of the map data exceeds at least one of a second quality associated with the existing virtual map or a threshold data quality.

12. The method as recited in claim 7, wherein the existing virtual map and the new existing virtual map are accessible via customer devices of customers.

13. The method as recited in claim 7, further comprising:
   determining an orientation associated with the image data; and
   generating the map data based at least in part on the orientation.

14. The method as recited in claim 7, further comprising continuing to update the exiting virtual map or continuing to generate one or more new existing virtual maps based at least in part on additional image data captured by UAV.

15. A method comprising:
   determining, based at least in part on sensor data captured by one or more unmanned aerial vehicles (UAVs), map data associated with one or more geographic locations;
   determining an existing virtual map associated with the one or more geographic locations; and
   determining one or more updates for the existing virtual map based at least in part on the map data.

16. The method as recited in claim 15, further comprising:
   updating the existing virtual map based at least in part on the one or more updates; or
   generating a new existing virtual map that corresponds to the existing virtual map based at least in part on the one or more updates.

17. The method as recited in claim 16, further comprising continuing to update the exiting virtual map or continuing to generate one or more new existing virtual maps based at least in part on additional sensor data captured by a plurality of UAVs.

18. The method as recited in claim 15, further comprising determining that a quality of the sensor data meets or exceeds a threshold data quality.

19. The method as recited in claim 15, further comprising:
   determining that a quality of at least a portion of the sensor data fails to meet or exceed a threshold data quality; and
   excluding, based at least in part on the quality, the at least the portion of the sensor data from the one or more updates.

20. The method as recited in claim 15, further comprising:
   determining an orientation associated with the sensor data; and
   generating the map data based at least in part on the orientation.

* * * * *